United States Patent
Chari et al.

(10) Patent No.: US 9,806,871 B2
(45) Date of Patent: Oct. 31, 2017

(54) SELECTIVE SUB-CARRIER PROCESSING

(71) Applicant: Imagination Technologies, Limited, Kings Langley (GB)

(72) Inventors: Sujai Chari, Burlingame, CA (US); Meesaraganda Surendra Raju, Bangalore (IN)

(73) Assignee: Imagination Technologies (GB)

( * ) Notice: Subject to any disclaimer, the term of this patent is extended or adjusted under 35 U.S.C. 154(b) by 72 days.

(21) Appl. No.: 14/714,312

(22) Filed: May 17, 2015

(65) Prior Publication Data
US 2016/0337096 A1   Nov. 17, 2016

(51) Int. Cl.
| | |
|---|---|
| H04L 5/00 | (2006.01) |
| H04L 1/00 | (2006.01) |
| H04L 27/26 | (2006.01) |
| H04W 52/02 | (2009.01) |

(52) U.S. Cl.
CPC ............ *H04L 5/006* (2013.01); *H04L 1/0053* (2013.01); *H04L 5/0007* (2013.01); *H04L 5/0048* (2013.01); *H04L 27/2647* (2013.01); *H04W 52/0209* (2013.01); *H04L 1/0003* (2013.01); *H04L 1/0009* (2013.01); *H04L 1/0057* (2013.01)

(58) Field of Classification Search
None
See application file for complete search history.

(56) References Cited

U.S. PATENT DOCUMENTS

| | | | |
|---|---|---|---|
| 7,593,378 B1 | 9/2009 | Murali et al. | |
| 8,064,897 B2 * | 11/2011 | Matsumoto | H04L 5/0044 |
| | | | 370/232 |
| 2005/0032514 A1 * | 2/2005 | Sadri | H04W 52/346 |
| | | | 455/423 |
| 2006/0109923 A1 * | 5/2006 | Cai | H04B 7/0619 |
| | | | 375/260 |
| 2006/0234715 A1 | 10/2006 | Cho et al. | |
| 2007/0049990 A1 | 3/2007 | Klostermann et al. | |
| 2007/0211641 A1 | 9/2007 | Fu et al. | |

(Continued)

FOREIGN PATENT DOCUMENTS

| | | |
|---|---|---|
| WO | WO 2007/069210 | 6/2007 |
| WO | WO 2011/044959 | 4/2011 |

OTHER PUBLICATIONS

Patent Act of 1977, Combined Search and Examination Report under sections 17 & 18(3), Application No. GB1605520.4, Dated Nov. 24, 2016.

*Primary Examiner* — Charles C Jiang
*Assistant Examiner* — Rose Clark
(74) *Attorney, Agent, or Firm* — Brian R. Short

(57) ABSTRACT

Apparatuses, methods, apparatuses, and systems for selective subcarrier processing are disclosed. One embodiment of a method includes determining whether a signal quality of a received multi-carrier signal is better than a predetermined signal quality, wherein the predetermined signal quality is selected to ensure that a probability of error free decoding of the received signal is greater than a predetermined threshold, and after determining that the signal quality of the received multi-carrier signal is better than the predetermined signal quality, determining which of subcarriers of the multi-carrier signal to perform receive signal processing based on a relative signal quality of each of the subcarriers.

29 Claims, 12 Drawing Sheets

Transceiver 100

(56) References Cited

U.S. PATENT DOCUMENTS

| | | | |
|---|---|---|---|
| 2008/0063097 A1* | 3/2008 | Horiuchi | H04B 7/15542 375/260 |
| 2009/0279498 A1 | 11/2009 | Li et al. | |
| 2010/0008400 A1 | 1/2010 | Chari | |
| 2010/0296389 A1* | 11/2010 | Khandekar | H04L 5/0007 370/216 |
| 2011/0103497 A1 | 5/2011 | Wilhelmsson et al. | |
| 2013/0010964 A1* | 1/2013 | Fong | H04L 5/0053 380/277 |
| 2013/0016639 A1* | 1/2013 | Xu | H04L 5/001 370/311 |
| 2013/0039397 A1 | 2/2013 | Stadelmeier et al. | |
| 2013/0053082 A1* | 2/2013 | Chai | H04W 52/287 455/509 |
| 2013/0100846 A1* | 4/2013 | Park | H04W 24/10 370/252 |
| 2013/0201834 A1* | 8/2013 | Klingenbrunn | H04W 28/12 370/236 |
| 2013/0322340 A1 | 12/2013 | Nishio et al. | |
| 2014/0036818 A1 | 2/2014 | Koskela | |
| 2014/0254701 A1 | 9/2014 | Geirhofer et al. | |
| 2014/0293818 A1* | 10/2014 | Sesia | H04B 17/318 370/252 |
| 2015/0103714 A1 | 4/2015 | Lee et al. | |
| 2015/0171937 A1* | 6/2015 | Murakami | H04B 7/04 375/267 |

\* cited by examiner

Determining whether a signal quality of a received multi-carrier signal is better than a predetermined signal quality, wherein the predetermined quality is selected to ensure that a probability of error free decoding of the received signal is greater than a predetermined threshold
910

After determining that the signal quality of the received multi-carrier signal is better than the predetermined signal quality, determining which of subcarriers of the multi-carrier signal to perform receive signal processing based on a relative signal quality of each of the subcarriers
920

FIGURE 9A

Determining whether a signal quality of a received multi-carrier signal is better than a predetermined signal quality, wherein the predetermined quality is selected to ensure that a probability of error free decoding of the received signal is greater than a predetermined threshold
911

After determining that the signal quality of the received multi-carrier signal is better than the predetermined signal quality, determining which subcarriers of the multi-carrier signal not to perform receive signal processing based on a relative signal quality of each of the subcarriers
921

FIGURE 9B

```
┌─────────────────────────────────────────────────────────────────┐
│  Determining whether a signal quality of a received multi-carrier signal is better than a  │
│  predetermined signal quality, wherein the predetermined quality is selected to ensure that a │
│  probability of error free decoding of the received signal is greater than a predetermined │
│                                threshold                         │
│                                  1210                            │
└─────────────────────────────────────────────────────────────────┘
                                    │
                                    ▼
┌─────────────────────────────────────────────────────────────────┐
│  After determining that the signal quality of the received multi-carrier signal is better than the │
│  predetermined signal quality, determining which of subcarriers of the multi-carrier signal to │
│       perform receive signal processing based on a function of a selected coding rate │
│                                  1220                            │
└─────────────────────────────────────────────────────────────────┘
```

FIGURE 12A

```
┌─────────────────────────────────────────────────────────────────┐
│  Determining whether a signal quality of a received multi-carrier signal is better than a  │
│  predetermined signal quality, wherein the predetermined quality is selected to ensure that a │
│   probability of error free decoding of the received signal is greater than a predetermined │
│                                threshold                         │
│                                  1211                            │
└─────────────────────────────────────────────────────────────────┘
                                    │
                                    ▼
┌─────────────────────────────────────────────────────────────────┐
│  After determining that the signal quality of the received multi-carrier signal is better than the │
│  predetermined signal quality, determining which subcarriers of the multi-carrier signal not to │
│       perform receive signal processing based on a function of a selected coding rate │
│                                  1221                            │
└─────────────────────────────────────────────────────────────────┘
```

FIGURE 12B

SELECTIVE SUB-CARRIER PROCESSING

FIELD OF THE DESCRIBED EMBODIMENTS

The described embodiments relate generally to wireless communications. More particularly, the described embodiments relate to systems, methods and apparatuses for selectively processing sub-carriers of a received multi-carrier signal.

BACKGROUND

The proliferation of mobile devices has driven the desire to reduce the power consumption of integrated circuits that support transmission and reception of wireless signals of the mobile devices. Typical implementations of OFDM (orthogonal frequency division multiplexing) receivers involve the demodulation/decoding of the received signal on all the subcarriers where the transmitter encoded information. Therefore, the receiver power consumption is impacted by the processing on all the subcarriers.

It is desirable to have methods apparatuses, and systems for selectively processing sub-carriers of a received multi-carrier signal.

SUMMARY

An embodiment includes a receiver, wherein the receiver includes a receive chain and a controller. The receive chain is operative to receive a multi-carrier signal. The controller is operative to determine whether a signal quality of the received multi-carrier signal is better than a predetermined signal quality, wherein the predetermined signal quality is selected to ensure that a probability of error free decoding of the received signal is greater than a predetermined threshold, and determine which of subcarriers of the multicarrier signal to perform receive signal processing or which multicarrier signals not to perform receive signal processing based on a relative signal quality of each of the subcarriers after determining that the signal quality of the received multi-carrier signal is better than the predetermined signal quality.

Another embodiment includes a method of selective sub-carrier processing. The method includes determining whether a signal quality of a received multi-carrier signal is better than a predetermined signal quality, wherein the predetermined signal quality is selected to ensure that a probability of error free decoding of the received signal is greater than a predetermined threshold, and after determining that the signal quality of the received multi-carrier signal is better than the predetermined signal quality, determining which of subcarriers of the multi-carrier signal to either perform receive signal processing based on a relative signal quality of each of the subcarriers, or not to perform receive signal processing based on the relative signal quality of each of the subcarriers.

Other aspects and advantages of the described embodiments will become apparent from the following detailed description, taken in conjunction with the accompanying drawings, illustrating by way of example the principles of the described embodiments.

BRIEF DESCRIPTION OF THE DRAWINGS

FIG. 9A shows a flow chart that includes steps of methods for selective processing of subcarriers of a received multi-carrier signal, according to an embodiment.

FIG. 9B show a flow chart that includes steps of methods for selective processing of subcarriers of a received multi-carrier signal, according to another embodiment.

FIG. 12A shows a flow chart that includes steps of methods for selective processing of subcarriers of a received multicarrier signal, according to another embodiment.

FIG. 12B shows a flow chart that includes steps of methods for selective processing of subcarriers of a received multicarrier signal, according to another embodiment.

DETAILED DESCRIPTION

The embodiments described include methods, apparatuses, and systems for selectively processing sub-carriers of a received multi-carrier signal. The selective subcarrier processing save power as compared to receiver systems that do not include selective subcarrier processing. The described embodiments include identifying when selective subcarrier processing should be considered, and further, various methods of implementing the selective processing of the subcarriers.

For an embodiment, the transmission signals between a first transceiver and a second transceiver include multi-carrier modulation signals. Multi-carrier modulation (MCM) is a method of transmitting data by splitting it into several components, and sending each of these components over separate carrier signals. The individual carriers have narrow bandwidth, but the composite signal can have broad bandwidth. The advantages of MCM include relative immunity to fading caused by transmission over more than one path at a time (multipath fading), less susceptibility than single-carrier systems to interference caused by impulse noise, and enhanced immunity to inter-symbol interference.

An exemplary form of MCM includes orthogonal frequency-division multiplexing (OFDM). OFDM is essentially identical to coded OFDM (COFDM) and discrete multi-tone modulation (DMT), and is a frequency-division multiplexing (FDM) scheme used as a digital multi-carrier modulation method. The primary advantage of OFDM over single-carrier schemes is its ability to cope with severe channel conditions (for example, narrowband interference and frequency-selective fading due to multipath) without complex equalization filters. Channel equalization is simplified because OFDM may be viewed as using many slowly modulated narrowband signals rather than one rapidly modulated wideband signal. The low symbol rate makes the use of a guard interval between symbols affordable, making it possible to eliminate intersymbol interference (ISI) and utilize echoes and time-spreading to achieve a diversity gain, that is, a signal-to-noise ratio improvement.

At least some of the described embodiments include identifying when to implement selective subcarrier processing.

Determining Feasibility of Selective Subcarrier Processing

Figure 1:
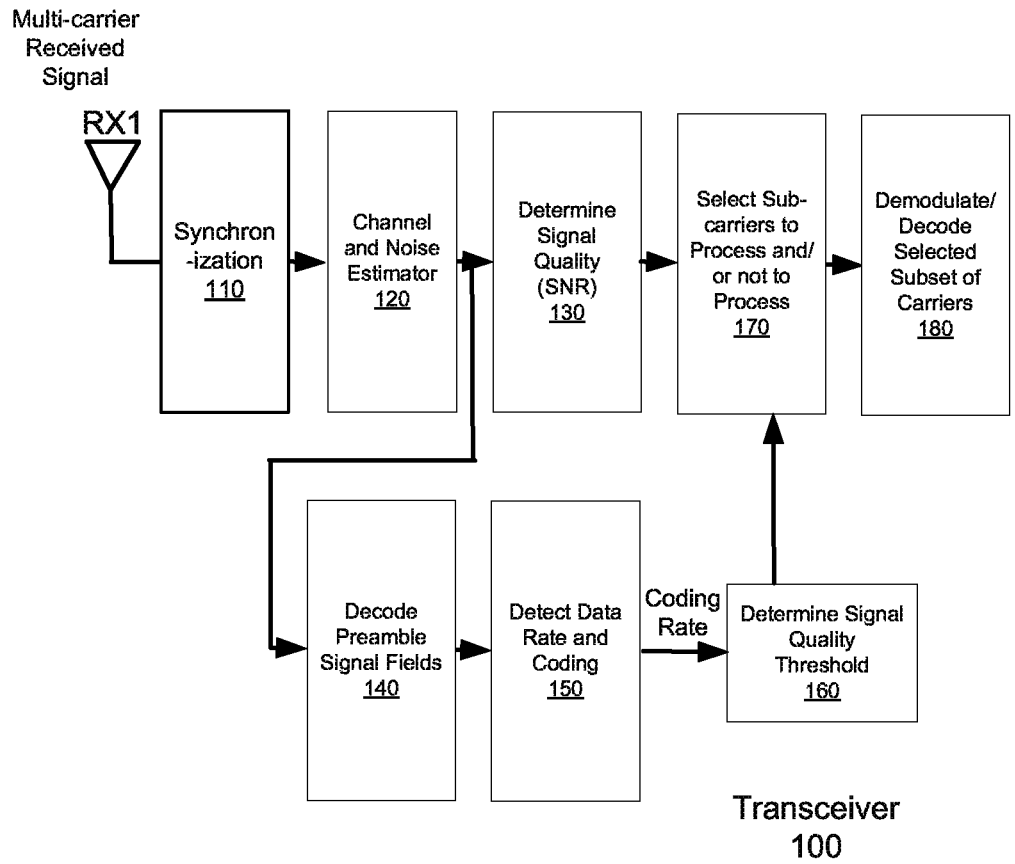
FIG. 1 shows a receiver portion of a transceiver that includes selective processing of subcarriers of a received multicarrier signal based on a signal quality of each subcarrier, according to an embodiment.

FIG. 1 shows a receiver portion of a transceiver that includes selective processing of subcarriers of a received multicarrier signal based on a signal quality of each subcarrier, according to an embodiment. Upon receiving a signal, synchronization is performed to determine an OFDM signal boundary on the received signal. For example, a Synchronization Block 110 of a transceiver 100 in FIG. 1 shows the process of synchronization where a packet is determined, for example, to be a valid OFDM signal and the symbol boundary of the OFDM signal is determined. Next, based on knowledge of the transmitted OFDM symbols, the receiver estimates the channel and noise for the received signal for each subcarrier as shown in a Channel and Noise Estimator block 120 of FIG. 1. Using the channel and noise, an SNR (signal to noise ratio) per subcarrier and an overall average SNR for the received signal can be determined. SNR is one measure of signal quality. As shown in a Determine Signal Quality block 130 of FIG. 1, a measure of signal quality (including, for example, SNR) may be used to assess the quality of the received signal.

While the processing blocks of FIG. 1 are shown separately, it is to be understood that this is for ease of description, and that the functional processing can be represented and implemented in alternate forms.

For at least some embodiments, following channel and noise estimation, the receiver decodes subsequent OFDM symbols during the preamble of the OFDM symbols to determine information about the transmitted signal characteristics for the payload such as modulation, coding rate, and packet length as shown in a Decode Preamble Signal Fields block 140 and a Detect Data Rate and Coding block 150 of FIG. 1. Additionally, for at least some embodiments, based on the preamble signal processing, a signal quality threshold is determined for the received signal, which is included, for example, in a Determine Signal Quality Threshold block 160 of FIG. 1. For at least some embodiments, the signal quality is compared against a predetermined or the previously described signal quality threshold determined based on preamble signal processing. For an embodiment, the signal quality threshold is selected to ensure that a received signal with the stated signal characteristics (that is, modulation, coding rate, packet length) could be decoded error free with probability greater than a predetermined error free probability threshold if the predetermined signal quality threshold is exceeded. If the signal quality of the received signal exceeds this predetermined signal quality threshold, then selective subcarrier processing is implemented which includes choosing a subset of all subcarriers to be processed by the receiver in order to decode the received signal. A common measure of signal quality is the Signal to Noise Ratio (SNR) of the received signal. The calculation of SNR along with the selection of a predetermined signal quality or SNR threshold is detailed below.

For an embodiment, a lookup table is then used to determine the approximate required SNR for the data rate of the current packet being received. If the average SNR of the signal is determined to be some threshold above the required SNR in the lookup table for the data rate, then selective subcarrier processing can be considered.

That is, for at least some embodiments, the difference between the average SNR and the required SNR must above an SNR threshold. For at least some embodiments, factors that affect the choice of the SNR threshold include the error in the SNR measurement, the sensitivity of the PER (packet error rate) to the SNR (that is, PER vs SNR slope), the frequency selectivity of the channel, the noise profile across the channel, and/or the coding rate.

Depending on the channel and noise estimation algorithms and also the number of OFDM symbols used to estimate the SNR, the accuracy of the SNR estimate is impacted. For a relatively inaccurate SNR estimate, a higher threshold may be necessary to ensure that subcarriers are not incorrectly dropped from processing. For an embodiment, the error of the SNR measurement is also weighed against the sensitivity of the PER to the change in SNR. For instance, if the PER changes substantially versus a small change in SNR for a particular data rate and coding rate, then the threshold needs to be higher to ensure that if subcarriers are dropped from processing, there is adequate margin to properly decode the signal.

For at least some embodiments, the channel type impacts the SNR required to properly decode a signal. Typically, LOS (line-of-sight) channels can decode a received signal for a particular data rate at a lower SNR than an NLOS (non-line-of-sight) channel. Various methods can be used in the preamble processing like channel estimation and associated frequency selectivity to determine whether the channel is LOS or NLOS. For LOS, for an embodiment, a lower threshold is used in comparison with NLOS. Alternatively, for an embodiment, multiple lookup tables are available, one for LOS and one for NLOS in determining the required SNR (and hence the SNR threshold could be the same for both cases). For at least some embodiments, the channel type (LOS or NLOS) is determined by examining the magnitude of correlation peaks relative to the signal power during synchronization. Typically, LOS channels exhibit higher correlation peaks than NLOS or more dispersive channels.

For at least some embodiments, another method that is used to estimate the channel type includes measuring the frequency selectivity of the channel. For LOS channels, the channel profile will not exhibit as much frequency selectivity as NLOS channels. One possible measure includes counting the number of subcarriers whose power is within some threshold (for example, 3 dB) of the mean power of the channel. When the number of such subcarriers is a high percentage, then the channel is likely LOS.

In addition to data rate, for at least some embodiments, a coding type (for example, BCC (binary convolutional code), LDPC (low-density parity check)) plays a role in the required SNR too. For an embodiment, the lookup table has the required SNR for different coding schemes.

For at least some embodiments, even in cases where the average SNR does not exceed the desired SNR by the threshold, the noise profile is shaped due to interference/spurs. In such cases, a priori information (e.g. from previous packets) or preamble processing is used to determine that portions of the spectrum where the noise is high may not be suitable for decoding. For at least some embodiments, for a noise spectrum that is shaped due to spurs/interference, a higher SNR threshold is used to trigger selective subcarrier processing or the method of choosing which and number of subcarriers to drop (i.e. not process) is modified due to the presence of colored noise.

Selecting which Subcarriers to Process and not Process

At least some embodiments include using one or more of several possible metrics and selection criteria based on these metrics that are used to decide which subcarriers should be processed during the decoding process and which subcarriers should not be processed to save power. The idea is to skip processing those subcarriers which do not preclude the successful decoding a received signal as shown in a Select Subcarriers to Process and/or not to Process block 170 in FIG. 1. Following the selection of subcarriers, the signal is demodulated and decoded using the selected subcarriers to process as shown in a Demodulate/Decode Selected Subset of Subcarriers block 180 of FIG. 1.

For example, for at least some embodiments, the lowest SNR subcarriers are excluded from receiver processing. For at least some embodiments, the number of lowest SNR subcarriers is chosen as a function of the coding rate. Specifically, a certain percentage of subcarriers as a function of the coding rate are used as a target for not being decoded. For example, for an embodiment, if the coding rate is 1/2, then the maximum possible subcarriers that are not processed is 50%. However, if 50% of the subcarriers are not processed, the remainder 50% should have sufficiently high SNRs that the removal of the benefit of coding (by not processing half the subcarriers) does not noticeably reduce the likelihood of successful decoding of the signal. In practice, there is some margin chosen such that the percent of subcarriers not processed in this example would be less than 50%. The actual amount less than 50% that would not be processed depend on the SNRs of the subcarriers which are being processed.

In general, for a signal with coding rate r, the fraction of subcarriers that may not be processed should be less than (1−r). As mentioned above, for at least some embodiments a margin shall be chosen which sets the actual fraction of subcarriers to not be processed as $\gamma*(1-r)$, where $\gamma<1$.

FIGS. 2A, 2B, 3A, 3B shown simulation results that depict a variation in performance as a function of percentage of subcarriers that were not processed (also denoted as "erasures" in the legend of the plots), according to at least some embodiments. For the simulations, the following conditions were used for the 802.11n WiFi standard. The conditions included modulation coding schemes 0, 2, 5, 7, with packet lengths of 4095 bytes, and a CMD channel model.

For MCS 0, if the SNR>8 dB, then even with 45% erasures, 10% PER can be achieved. The coding rate is 1/2 for this MCS. Therefore, the fraction of subcarriers that may not be processed is (1−r)=1/2. Thus, if the percentage of subcarriers processed is more than 50% (or equivalently if the percentage of subcarriers not processed is less than 50%), successful decoding is possible at sufficiently high SNR or signal quality.

Figure 2A:
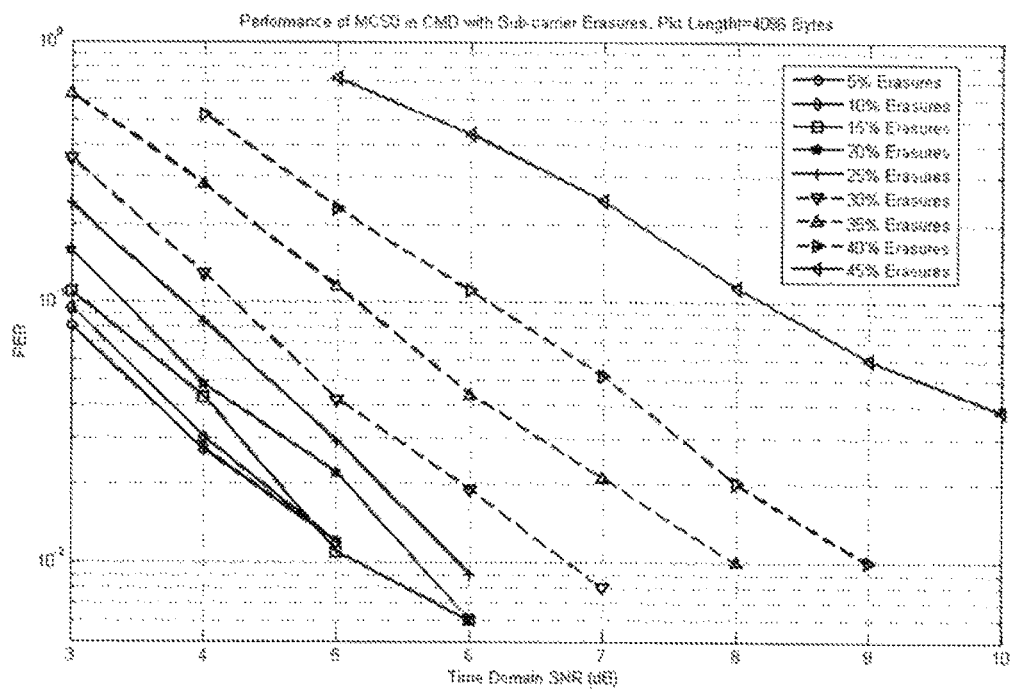
FIG. 2A is a plot of results of a simulation that shows the variation in performance as a function of percentage of subcarriers not processed (sub-carrier erasures) for a modulation and coding scheme MCS0 and rate 1/2 code, according to an embodiment.
Figure 2B:
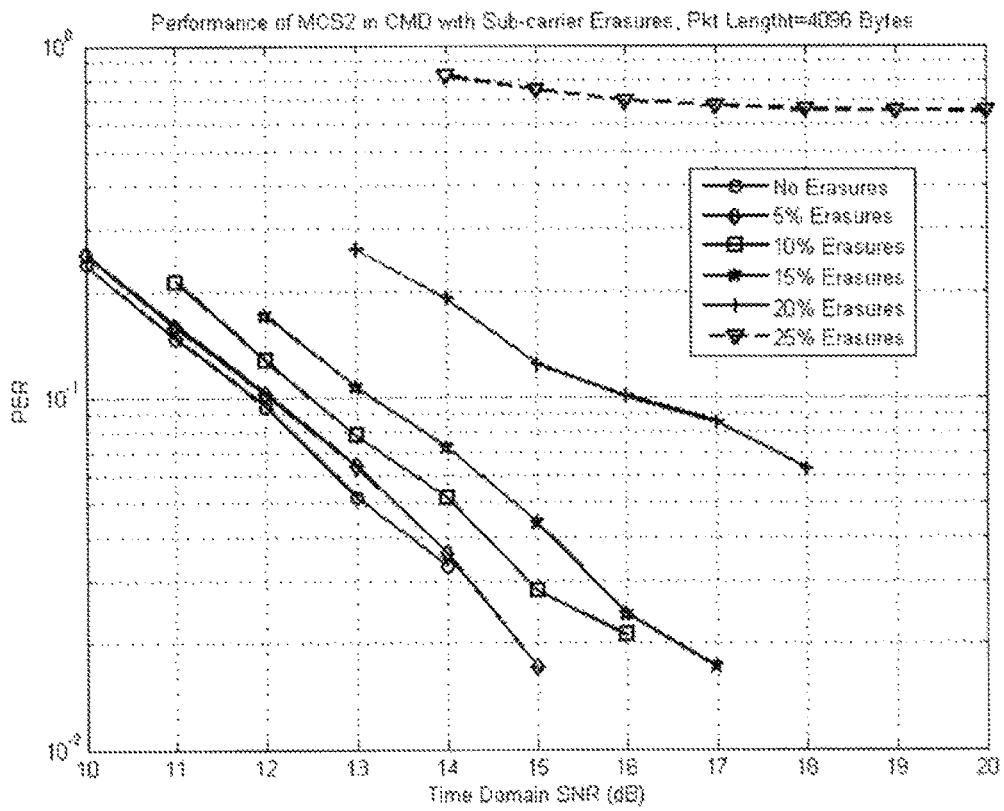
FIG. 2B is a plot of results of a simulation that shows the variation in performance as a function of percentage of subcarriers not processed (sub-carrier erasures) for a modulation and coding scheme MCS2 and rate 3/4 code, according to an embodiment.
Figure 3A:
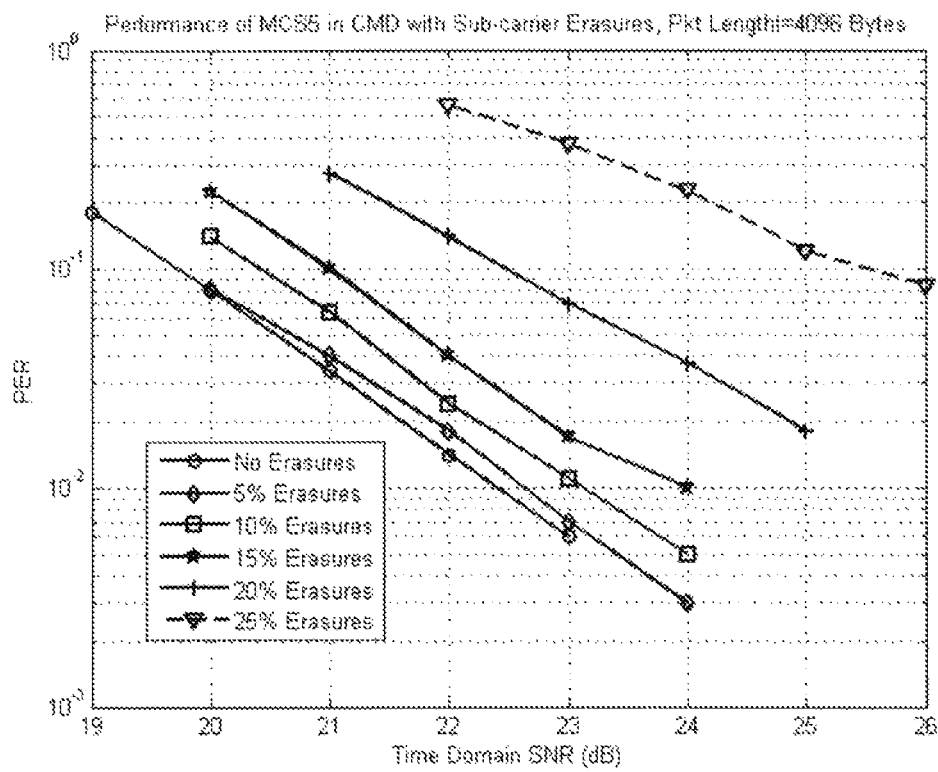
FIG. 3A is a plot of results of a simulation that shows the variation in performance as a function of percentage of subcarriers not processed (sub-carrier erasures) for a modulation and coding scheme MCS5 and rate 2/3 code, according to an embodiment.
Figure 3B:
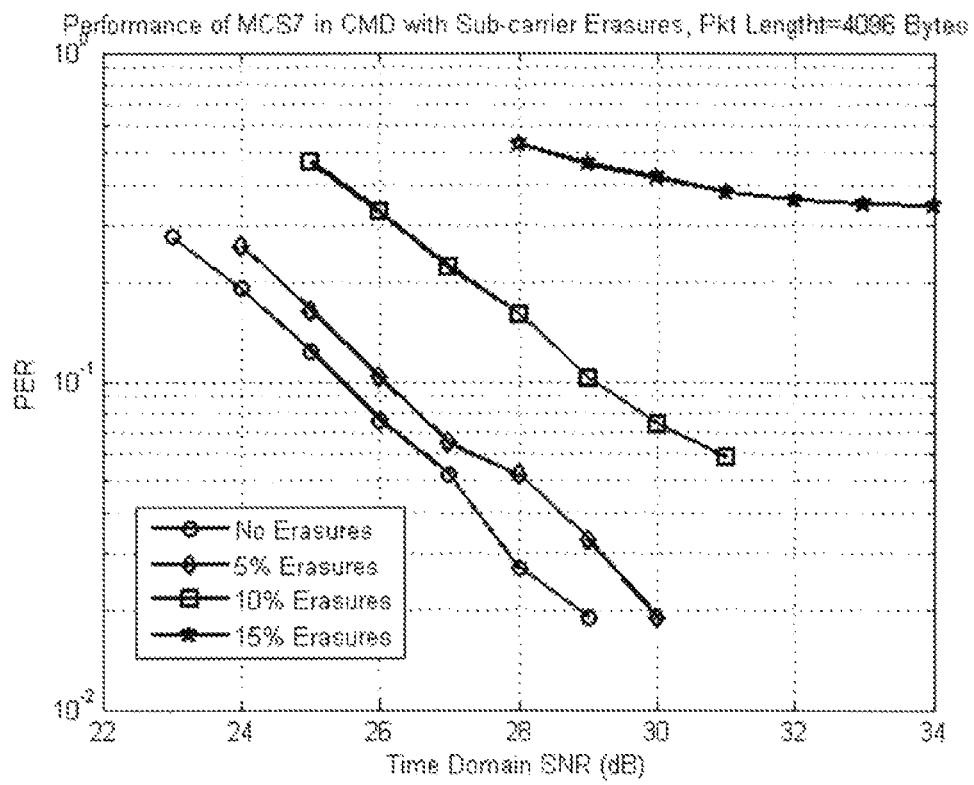
FIG. 3B is a plot of results of a simulation that shows the variation in performance as a function of percentage of subcarriers not processed (sub-carrier erasures) for a modulation and coding scheme MCS7 and rate 5/6 code, according to an embodiment.

FIGS. 2A, 2B, 3A, 3B also show results for the higher MCSs which have higher modulations and weaker codes (3/4, 2/3, 5/6). More specifically, FIG. 2A is a plot of results of a simulation that shows the variation in performance as a function of percentage of subcarriers not processed (sub-carrier erasures) for a modulation and coding scheme MCS0 and rate 1/2 code, for an embodiment. FIG. 2B is a plot of results of a simulation that shows the variation in performance as a function of percentage of subcarriers not processed (sub-carrier erasures) for a modulation and coding scheme MCS2 and rate 3/4 code, for an embodiment. FIG. 3A is a plot of results of a simulation that shows the variation in performance as a function of percentage of subcarriers not processed (sub-carrier erasures) for a modulation and coding scheme MCS5 and rate 2/3 code, for an embodiment. FIG. 3B is a plot of results of a simulation that shows the variation in performance as a function of percentage of subcarriers not processed (sub-carrier erasures) for a modulation and coding scheme MCS7 and rate 5/6 code, for an embodiment.

Due to the weaker codes, the percentage of subcarriers that must be processed is higher than 50%, which is sufficient for MCS 0 (rate 1/2 code) at sufficiently high signal quality.

Note that the subcarriers that were not processed in these simulations were chosen based on the subcarriers that had the lowest SNR. For instance, if the target was to not process 45% of the subcarriers, the 45% of subcarriers with the lowest SNR were chosen to not be processed.

Other methods besides just choosing the lowest SNR subcarriers may be used that factor in the coding scheme that was applied by the transmitter for the received signal. Specifically, approaches to choosing subcarriers to not process are described below for Binary convolutional coding and LDPC.

Figure 4:
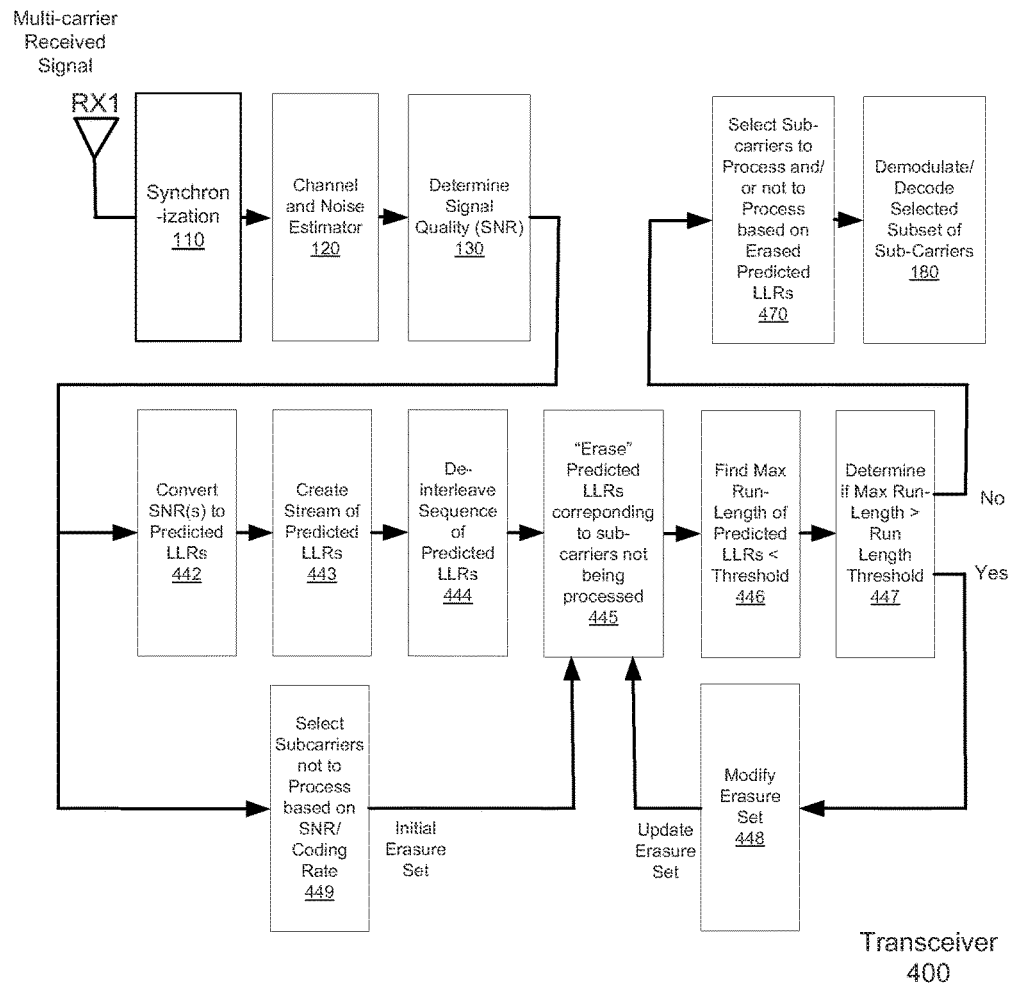
FIG. 4 shows a receiver portion of a transceiver that includes selective processing of subcarriers of a received convolutional encoded multicarrier signal based on streams of predicted least likelihood ratios (LLR(s)) of the received multicarrier signal, according to an embodiment.

FIG. 4 shows a receiver portion of a transceiver 400 that includes selective processing of subcarriers of a received multicarrier signal based on streams of predicted least likelihood ratios (LLR(s)) of the received convolutional encoded multicarrier signal, according to an embodiment.

For the case of convolutional encoding, for an embodiment, the LLRs are predicted based on the SNR for each subcarrier (for example, by a SNR to a Predicted LLR block 442), knowledge of constellation mapping and the interleaver. For an embodiment, the confidence level of each bit (or equivalently the predicted mean LLR) is obtained as a function of the SNR and constellation mapper. The set of predicted LLRs for each bit can be permuted or deinterleaved based on the knowledge of the interleaver (by, for example, a Create a Stream of Predicted LLRs block 443), thereby creating a stream of predicted LLRs (with each predicted LLR corresponding to the confidence level of each bit), which are de-interleaved at de-interleaving block 444. For an embodiment, the percentage of subcarriers to not be processed is selected as joint function of SNR as well as avoiding a long run length of low predicted LLRs (relative to the distance properties of the code).

For an embodiment, a subcarrier selection block 449 selects subcarriers not to process based on the SNR of the subcarrier and/or a coding rate. For an embodiment, predicted LLRs that correspond with the subcarriers not to process are erased at block 445. For at least some embodiments, the erasure of the LLR simply means to assign the lowest possible confidence level which is equivalent to stating that the probability of the bit being a 1 is equal to the probability of the bit being a 0 (that is, a 50/50 chance of bit being a 1 or 0). The erasures serve the purpose of notifying the decoder that no useful information is available about the likely value of the bit—which in this case is due to the fact that the corresponding subcarrier to which the bit was mapped is not being processed. At block 446, a maximum run length of predicted LLRs (that is, number of consecutive predicted LLRs) is determined by comparing each of the predicted LLRs with a threshold. At processing block 447, the determined maximum run length of predicted LLRs that are below the threshold is compared with a run length threshold. If the maximum run length is greater than the run length threshold, the set of subcarriers erased is modified at processing block 448. That is, the set of predicted LLRs that correspond with the subcarriers not to process and erased is modified—more specifically, reduced in number. For an embodiment, the reduction or modification includes removing from the "erased" list those predicted LLRs which had the highest LLRs/confidence levels before being erased. Note that by definition, the erased LLRs have predicted LLRs less than or equal to the threshold because the erased LLRs are set to the lowest possible LLR or confidence level. The processing of blocks 445, 446 and 447 are repeated.

If at processing block 447 the determined maximum run length of predicted LLRs that are below the threshold is determined to be less than the run length threshold, processing block 470 selects subcarrier to process and/or subcarriers not to process based on the erased predicted LLRs.

For at least some embodiments, subcarriers are chosen to not be processed while avoiding a number of confidence levels in contiguous sequences of the de-interleaved predicted LLR sequence that are below a confidence threshold, that is above a run-length threshold.

Following the selection of subcarriers, the signal is demodulated and decoded using the selected subcarriers to process as shown in Demodulate/Decode Selected Subset of Subcarriers block 180.

Figure 5:
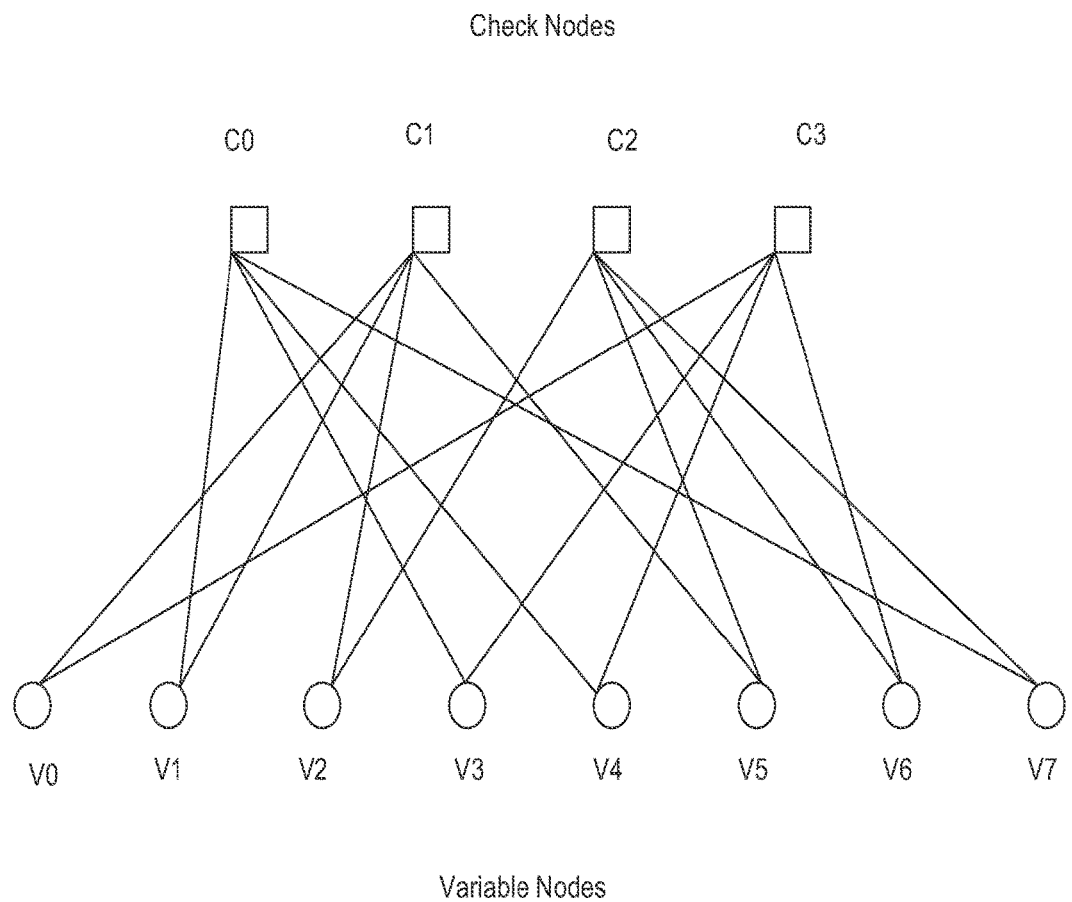
FIG. 5 shows a tanner graph for a parity check matrix that can be utilized for partitioning blocks of n input bit predictive log likelihood ratios (LLRs) to a low-density parity check (LDPC) decoder into a low confidence subset or a high confidence, according to an embodiment.

A better understanding of the described embodiments that utilize predictive LLRs and metrics for node classification in the LDPC decoder can be obtained by closely looking at the structure of the code and the decoding criterion. FIG. 5 shows a tanner graph for a parity check matrix that can be utilized for partitioning blocks of n input bit predictive LLRs to an LDPC decoder into a low confidence subset or a high confidence subset, according to an embodiment. This Tanner graph provides a graphical representation of an (8, 4) code. In this graph, the nodes of the graph are separated into two distinctive sets, and edges connect nodes of two different types. The two types of nodes a Tanner graph addresses are variable nodes (bit nodes or V-nodes) and check nodes (or C-nodes). Check node, $C_i$ is connected to variable node $V_j$ if the element $h_{ij}$ of the parity check matrix H is a 1. FIG. 5 shows the tanner graph representation for the above parity check matrix, given by H.

$$H = \begin{bmatrix} 0 & 1 & 0 & 1 & 1 & 0 & 0 & 1 \\ 1 & 1 & 1 & 0 & 0 & 1 & 0 & 0 \\ 0 & 0 & 1 & 0 & 0 & 1 & 1 & 1 \\ 1 & 0 & 0 & 1 & 1 & 0 & 1 & 0 \end{bmatrix}$$

Consider the perspective of the graph from bit node, $V_0$. This bit node is connected to 2 check nodes, $C_1$ and $C_3$ and hence bit node $V_0$ takes part in two parity checks and each of these checks involve three other bit nodes. For example, other bit nodes connected to $C_1$ are $V_1$, $V_2$ and $V_5$ and other bit nodes connected to $C_3$ are bit nodes $V_3$, $V_4$ and $V_6$.

The detector that minimizes the probability of error for the n-th bit, $b_n$ calculates a posterior Log-likelihood ratio (LLR), $\lambda_n$ given by, $$\lambda_n = \log \frac{Pr[b_n = 1 \mid r]}{Pr[b_n = 0 \mid r]},$$

where $r=[r_1, r_2, \ldots r_N]$ is the received vector.

The detector decides $\hat{b}_n=1$ if $\lambda_n \geq 0$ and $\hat{b}_n=0$ otherwise. The above can be simplified as $$\lambda_n = \log \frac{f(r_n \mid b_n = 1) \cdot Pr[b_n = 1 \mid \{r_{i \neq n}\}]}{f(r_n \mid b_n = 0) \cdot Pr[b_n = 0 \mid \{r_{i \neq n}\}]}$$

$$= \log \frac{f(r_n \mid b_n = 1)}{f(r_n \mid b_n = 0)} + \log \frac{Pr[b_n = 1 \mid \{r_{i \neq n}\}]}{Pr[b_n = 0 \mid \{r_{i \neq n}\}]}$$

The first term in $\lambda_n$ is called the Intrinsic Information and represents the contribution from the channel observation impacted by the transmitted $b_n$. For convenience, the received sample which is used to determine the LLR for $b_n$ shall be denoted as $r_n$ or equivalently the $n^{th}$ channel observation. The second term represents the contributions from other channel observations apart from the $n^{th}$ observation and is called as the Extrinsic information. Hence the reliability of a particular bit is influenced by both the intrinsic information which is a function of the channel reliability as well as information from other observations.

Assuming that the code bit $b_n$ is involved in exactly j parity checks, numbered 1 through j and say each of the j check nodes involve k−1 other bits.

Letting $b_i=[b_{i,2}, \ldots b_{i,k}]$ denote the set of code bits involved in the $i^{th}$ (i=1 . . . j) parity check excluding the code bit, $b_n$, and letting $\Phi(b)$ denote the parity of a set of bits, b. Then, the j parity check constraints involving code bit $b_n$ ensure that $b_n=\Phi(b_i)$, $\forall i=1 \ldots j$. Hence, the result is:

$$\lambda_n = \log \frac{f(r_n \mid b_n = 1)}{f(r_n \mid b_n = 0)} + \log \frac{Pr[\Phi(b_i) = 1, i \ldots j \mid \{r_{i \neq n}\}]}{Pr[\Phi(b_i) = 0, i \ldots j \mid \{r_{i \neq n}\}]}$$

Assuming that the code is cycle free, the vectors, $b_i$, i= 1 . . . j are conditionally independent given as $\{r_{i \neq n}\}$. Hence, the result is:

$$\lambda_n = \log\frac{f(r_n \mid b_n = 1)}{f(r_n \mid b_n = 0)} + \log\frac{\prod_{i=1}^{j} Pr[\Phi(b_i) = 1 \mid \{r_{i \neq n}\}]}{\prod_{i=1}^{j} Pr[\Phi(b_i) = 0 \mid \{r_{i \neq n}\}]}$$

$$= \log\frac{f(r_n \mid b_n = 1)}{f(r_n \mid b_n = 0)} + \sum_{i=1}^{j} \log\frac{Pr[\Phi(b_i) = 1 \mid \{r_{i \neq n}\}]}{Pr[\Phi(b_i) = 0 \mid \{r_{i \neq n}\}]}$$

$$= \log\frac{f(r_n \mid b_n = 1)}{f(r_n \mid b_n = 0)} + \sum_{i=1}^{j} \lambda_{\Phi(b_i)}$$

In the above, the extrinsic information (second term) can be interpreted as sum of message ($\lambda_{\Phi(b_j)}$) from all the check nodes involving code bit $b_n$.

Using the min-sum approximation, the each of the extrinsic information can be approximated as, $$\lambda_{\Phi(b_i)} \approx s_{\Phi(b_i)} |\lambda_{min}(b_i)|$$

where, $$s_{\Phi(b_i)} = -\prod_{m=2}^{k} \text{sign}(-\lambda_{i,m})$$

$$|\lambda_{min}(b_i)| = \min_{m=2,\ldots k}(|\lambda_{i,m}|)$$

The structure of the code and the decoding criterion explained in the previous section can be used to distinguish low confidence and high confidence nodes, or in other words less reliable (weaker) and more reliable nodes.

For at least some embodiments, nodes are classified based on the criterion that if a node having less intrinsic reliability is involved in multiple parity checks, then that node dominates the decision of the parity checks and secondly that node affects the extrinsic information of its neighboring bit nodes connected to a common check node. Such a bit node can be considered less reliable.

An example of a procedure for node classification based on the above embodiment includes the following steps. First, for each check node, find the most unreliable bit node with which it is associated, that is, the bit node with the lowest magnitude of the intrinsic information. Second, for every bit node, all the check nodes to which it is connected to are listed. Third, for each of the above check nodes (listed in the second step), check if the most unreliable bit node associated with the check node happens to be the bit node in question (based on the first step). If so, increment a counter specific to that bit node by 1. Fourth, the second step and the third step are repeated for all bit nodes. Fifth, bit nodes are classified as unreliable or bad, which can be denoted as a "weak node", if their associated counter values are greater than a threshold $\Gamma_{M_1}$.

Figure 6:
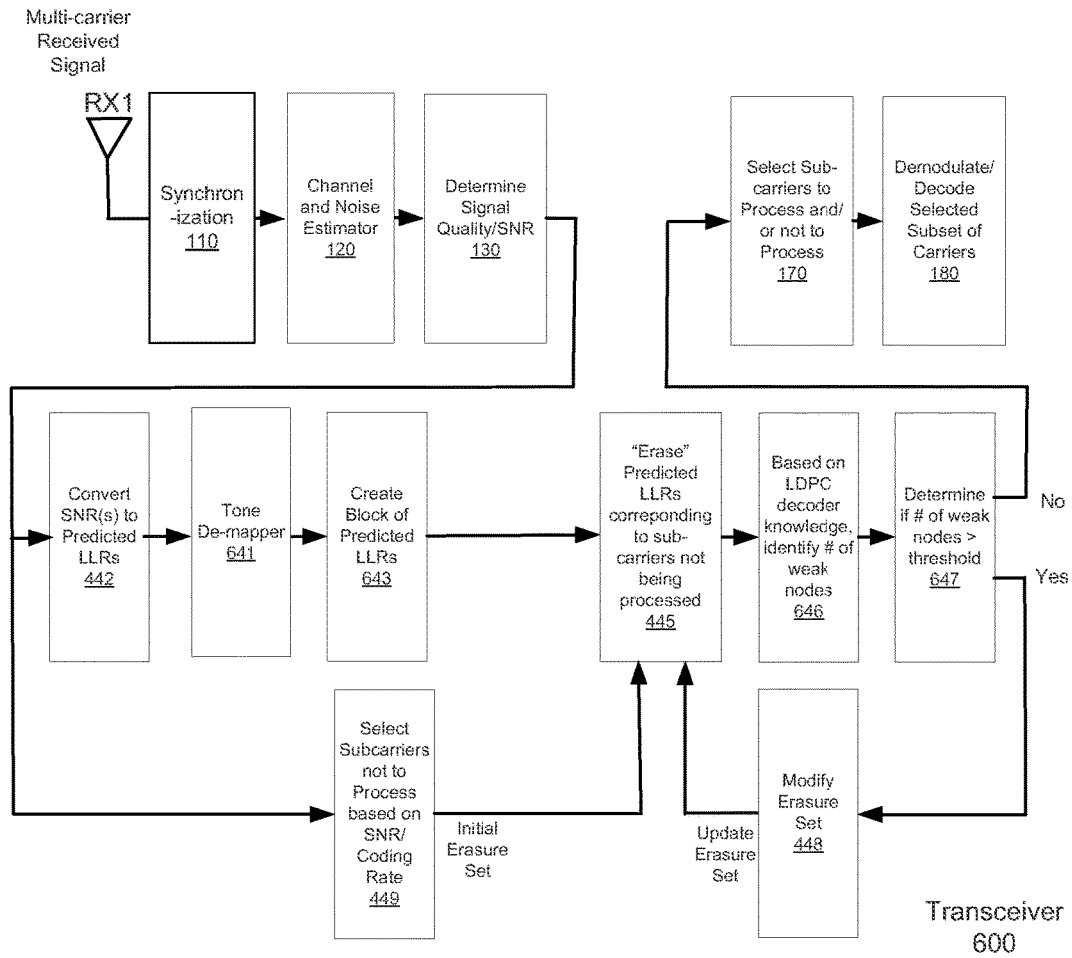
FIG. 6 shows a receiver portion of a transceiver that includes selective processing of subcarriers of a received LDPC encoded multicarrier signal based weak nodes of an LDPC decoder, according to an embodiment.

FIG. 6 shows a receiver portion of a transceiver 600 that includes selective processing of subcarriers of a received multicarrier signal based weak (unreliable) nodes of an LDPC decoder, according to an embodiment. This embodiment includes a tone de-mapper block 641 before the Create a Block of Predicted LLRs block 643.

Further, at least some embodiments include the erased predicted LLRs corresponding to subcarriers not to process (of processing block 445) being received by processing block 646 which identifies a number of weak (unreliable) nodes based on LDPC decoder knowledge. Processing block 647 determines whether the number of weak (unreliable) nodes exceeds a threshold. If the threshold is exceeded, the set of subcarriers erased is modified at processing block 448. That is, the set of predicted LLRs that correspond with the subcarriers not to process and erased is modified. The processing of blocks 445, 646 and 647 are repeated.

If processing block 647 determines that the number of weak (unreliable) nodes is less than the threshold, processing block 170 selects subcarrier to process and/or subcarriers not to process based on the erased predicted LLRs.

For at least some embodiments, for the case of LDPC decoding, in addition to SNR based subcarrier selection, an additional metric based counting of number of weak (unreliable) nodes is used to select which subcarriers should or should not be processed. Power consumption reduction by processing fewer nodes should be weighed against the possibility of increased iterations which increases power consumption.

Specifically, for an embodiment, the receiver identifies the number of check nodes connected to an unrealiable bit node having a reliability below a reliability threshold. Next, the receiver can select the subcarriers of the multi-carrier signal to perform receiver signal processing based on keeping the number of check nodes connected to a weak node having a reliability below a reliability threshold, less than a weak node number threshold. For an embodiment, the reliability of a bit node is determined based on a channel estimate and noise estimate for a subcarrier corresponding to the bit node.

Figure 7:
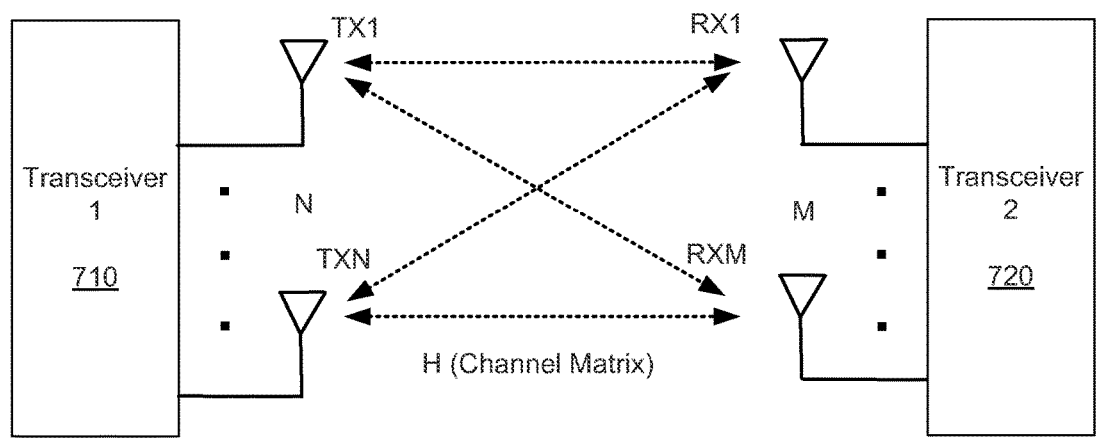
FIG. 7 shows a first transceiver, a second transceiver, and a MIMO transmission channel between the transceivers, according to an embodiment.

FIG. 7 shows a first transceiver 710, a second transceiver 720, and a MIMO transmission channel between the transceivers, according to an embodiment. As shown, the first transceiver 710 includes N antennas transmitting communication signals, and the second transceiver 720 includes M antennas receiving communications signals. Accordingly, the transmission channel between the first transceiver 710 and the second transceiver 720 can be characterized by an M×N channel matrix H. For an embodiment, the transmission signals between the first transceiver 710 and the second transceiver 720 include multi-carrier modulation signals.

An embodiment includes obtaining a channel matrix H per sub-carrier of a multi-carrier signal. For an embodiment, the channel matrix is determined at the receiver, and communicated back to the transmitter. However, for another embodiment, the channel matrix is determined at the transmitter. That is, by assuming reciprocity of the transmission channel, signals received by the transmitting transceiver from the receiving transmitter can be used to determine the channel matrix H.

Figure 8:
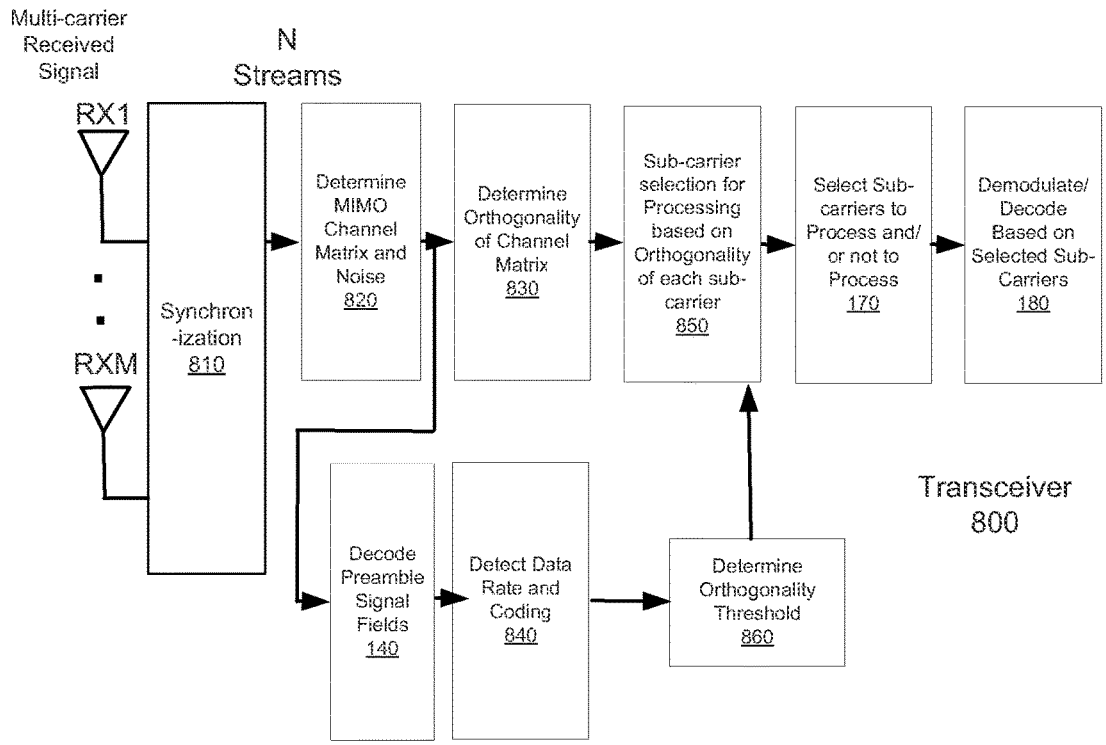
FIG. 8 shows a receiver portion of a multiple receiver transceiver that includes selective processing of subcarriers of a received multicarrier signal based on an orthogonality of a MIMO transmission channel of each of the subcarriers, according to an embodiment.

FIG. 8 shows a receiver portion of a multiple receiver transceiver that includes selective processing of subcarriers of a received multicarrier signal based on an orthogonality of a MIMO transmission channel of each of the subcarriers, according to an embodiment. Upon receiving a multiple signals, synchronization is performed to determine the OFDM signal boundary on each of the received signals. For example, a Synchronization Block 810 of a transceiver 800 in FIG. 8 shows the process of synchronization where a packet is determined, for example, to be a valid OFDM signal and the symbol boundary of the OFDM signal is determined, for each of the plurality of received signals.

For at least some embodiments, a processing block 820 determines the channel matrix of each subcarrier the plurality of receive signals. A processing block 830 determines the orthogonality of the channel matrix.

A processing block 860 determines an orthogonality threshold based on a detected data rate and coding as determined by the Decode Preamble Signal Fields block 140 and a Detect Data Rate and Coding block 840.

The subcarrier processing selection of each subcarrier is made based on the orthogonality determination of each subcarrier and the determined orthogonality threshold. More specifically, for an embodiment, subcarrier selection block 850 selects subcarriers not to process if the orthogonality of those subcarriers is less than the determined orthogonality threshold. The Select Subcarriers to Process and/or not to Process block 170 may functionally overlap the processing of block 850. Following the selection of subcarriers, the signal is demodulated and decoded using the selected subcarriers to process as shown in Demodulate/Decode Selected Subset of Subcarriers block 180 of FIG. 8.

For an embodiment, for MIMO receivers, in addition to SNR metrics, each subcarrier's channel matrix orthogonality or rank deficiency measures is used to choose subcarriers to drop from receiver processing. For example, for an embodiment, a receiver selects the subcarriers of the multi-carrier signal to perform receiver signal processing based an orthogonality of the channel matrix of each subcarrier being less than an orthogonality threshold. That is, the selected subcarriers are not processed if the orthogonality of the channel matrix of the subcarrier is less than the orthogonality threshold.

For an embodiment, the orthogonality is determined based on channel during a preamble of the received signal. The channel is estimated for each element of the channel matrix for every subcarrier. For at least some embodiments, a metric that is used to measure orthogonality is the orthogonality deficiency (o.d) metric. This metric, od is defined as $$od = \frac{\det(H^H H)}{\prod_{i=1}^{N\_Rx} \|h_i\|^2}$$

In the above, det(.) represents the determinant of the matrix and $h_i$ is the $i^{th}$ column of the matrix, H If H is singular, then the above metric is 0 and if the columns of H are completely orthogonal, the above metric equals 1. In general the value of the metric lies between 0 and 1. Therefore, a threshold can be selected between 0 and 1 (and possibly adapted). For an embodiment, the percentage of subcarriers not processed is a function of the coding rate similar to the previously discussed case for the SISO (single input, single output) system.

Other Methods of Selective Subcarrier Processing

Another embodiment for selecting the subcarriers of the multi-carrier signal to perform receiver signal processing and which subcarriers of the multi-carrier signal not to perform receiver signal processing is based on a function of power consumed per processed subcarrier, and a probability of decoding error. For an embodiment, the power consumption for receiver processing per subcarrier is estimated. For an embodiment, given a target power consumption, a target number of subcarriers to be processed is determined. Additionally, based on a desired probability of decoding error, a minimum number of subcarriers that require processing is determined. If the minimum number is less than or equal to the target number, then the target number of subcarriers can be processed. If the minimum number of subcarriers is greater than the target number, then the minimum number of subcarriers would be processed by the receiver.

Previously, the use of noise profile was described in relation to the choice of which subcarriers to process (and to not process) by the receiver. There is some penalty in receiver power consumption when the noise profile estimation is required. As mentioned earlier, for an embodiment, the savings in receiver power consumption is estimated based on the subcarriers chosen and the power per subcarrier saved in the blocks which are not processed. This savings should be weighed against the probability of slightly higher packet error rate which in turn increases the receiver power consumption as the packets in error will be required to be received again. Additionally, some power is consumed by requiring the software to track noise profile to help with interference/spurs monitoring. The power savings also will be dependent on whether the hardware design provides the ability to shut off portions of receiver blocks or simply benefits from no toggling of bits due to portions of receiver not being fed any actual signal with normal activity (the latter mode provides less savings than the former).

FIG. 9A shows flow charts that include steps of methods for selective processing of subcarriers of a received multi-carrier signal, according to an embodiment. A first step 910 includes determining whether a signal quality of a received multi-carrier signal is better than a predetermined signal quality, wherein the predetermined signal quality is selected to ensure that a probability of error free decoding of the received signal is greater than a predetermined threshold. A second step 920 includes after determining that the signal quality of the received multi-carrier signal is better than the predetermined signal quality, determining which of subcarriers of the multi-carrier signal to perform receive signal processing based on a relative signal quality of each of the subcarriers. For an alternate embodiment, the second step includes determining which of subcarriers of the multi-carrier signal not to perform receive signal processing based on a relative signal quality of each of the subcarriers after determining that the signal quality of the received multi-carrier signal is better than the predetermined signal quality.

For at least some embodiments, the relative signal quality of each of the subcarriers is determined based on a comparison between a signal quality of each of the subcarriers relative to the predetermined signal quality.

At least some embodiments additionally include determining a percentage of the subcarriers of the multi-carrier signal to perform receiver signal processing based on a function of a selected coding rate.

At least some embodiments additionally include predicting a plurality of LLRs (log likelihood ratios) including predicting an LLR for each bit of a received symbol of each subcarrier based on the SNR of the subcarrier, wherein the LLR reflects a confidence level of the bit, generating a de-interleaved sequence comprising de-interleaving the plurality of LLRs, and selecting subcarriers of the multi-carrier signal to perform receiver signal processing based on avoiding a number of confidence levels in contiguous sequences of the de-interleaved sequence that are below a confidence threshold, that is above a run-length threshold.

For at least some embodiments, the received signal includes a transmit signal received though a transmission medium, wherein the transmit signal includes LDPC (low-density parity check) encoding. These embodiments further include specifying a parity check matrix based on the LDPC encoding, generating a set of parity check bits, comprising multiplying a block of n input bits by the parity check matrix, wherein the input bits and any information associated with the input bits are denoted as a variable nodes, and wherein the parity check bits and any information associated with the parity check bits are denoted as check nodes. Further, these embodiments include identifying number of check nodes connected to a variable node having a reliability below a reliability threshold (also denoted "weak" node), and selecting the subcarriers of the multi-carrier signal to perform receiver signal processing based on keeping the number of weak nodes having a reliability below a reliability threshold less than a weak node number threshold. For at least some embodiments, a reliability of a variable node is determined based on a channel estimate and noise estimate for a subcarrier corresponding to the variable node.

For at least some embodiments, the channel estimate is determined during the preamble. For at least some embodiments, noise estimate are determined during the preamble or based on a priori knowledge.

For at least some embodiments, a receiver that receives the receive signal includes multiple receiver antennas, and wherein a channel between the receiver and a transmitter of the receive signal is characterized by a channel matrix for each subcarrier, and further comprising selecting the subcarriers of the multi-carrier signal to perform receiver signal processing based an orthogonality of the channel matrix of each subcarrier being less than a threshold (do not process if orthogonality is less than the threshold). For at least some embodiments, the orthogonality is determined based on channel and noise estimated during a preamble of the received signal.

For at least some embodiments, each element of the channel matrix is determined during the preamble. Each element of the matrix represents the channel estimate of the channel between the transmit and receive antennas for the corresponding element in the matrix. Since a known signal is transmitted during the preamble, the MIMO channel matrix (that is, each element of the matrix) for each subcarrier can be estimated. Once the channel matrix is estimated, the expected receive signal can be estimated based on knowledge of the transmitted preamble signal and the channel estimate. For at least some embodiments, the expected receive signal is subtracted from the actual received signal to generate a noise power estimate for each receive chain for each subcarrier as illustrated in the equations below.

The actual received signal can be expressed as:

$$y_k = H_k * x_k + n_k$$

where k is the subcarrier index,
$y_k$ is an M×1 vector representing the received signal for subcarrier k across the M receive chains,
$H_k$ is the M×N channel matrix for subcarrier k,
$x_k$ is the N×1 transmit vector across the N transmit chains for subcarrier k,
$n_k$ is the M×1 receive noise vector across the N receive chains for subcarrier k The noise power per receive chain per subcarrier may be estimated as follows:

$$\sigma_k^2 = E(|y_k - \hat{H}_k \hat{x}_k|^2)$$

where E denotes expectation or average of the quantity over many symbols,
$\hat{H}_k$ is the estimated channel matrix for subcarrier k,
$\hat{x}_k$ is the estimated transmitted symbol vector for subcarrier k (or the a priori known transmit symbol),
$\sigma_k^2$ is the estimated noise power vector per receive chain per subcarrier It should be noted that for at least some embodiments, the noise power is updated through the packet and also averaged across packets in time. Typically, the noise power will be a function of the analog gain setting, interference, and spurs. If sufficient data is collected over time, noise profiles can be developed for different gain settings and interference cases thereby allowing the recall of the relevant noise profile for a given packet rather than spending additional power computing noise profile during each received packet.

For at least some embodiments, selecting the subcarriers of the multi-carrier signal to perform receiver signal processing and which subcarriers of the multi-carrier signal not to perform receiver signal processing based on a function of power consumed per processed subcarrier, and a probability of decoding error. For instance, if the total subcarrier receiver processing consumes a total power of $P_R$, and a fraction, $\gamma$, of the subcarriers are processed, then the power savings may be $(1-\gamma)*P_R$ during active processing. If using the subset of subcarriers for receiver processing, increases the likelihood of decoding error by a fraction $\alpha$—meaning that a higher fraction of the packets have to be retransmitted by the transmitter and therefore, the receiver has to process more packets, namely $(1+\alpha)$ times the packets that would have been processed if all subcarriers were processed. Thus, the overall change in power consumption would be $(1-\gamma)*(1+\alpha)*P_R$.

Assuming that the overall duty cycle of active reception or fraction of time that the receiver is receiving packets (based on typical traffic patterns) is $\Delta$, and the overall receiver target power consumption is $P_T$, then the following constraint should be satisfied:

$$\Delta*(1-\gamma)*(1+\alpha)*P_R + (1-\Delta)*P_N < P_T;$$

wherein $P_T$ is the target receiver power consumption (including times where there is no packet received), wherein $P_R$ is the receiver power when all subcarriers are processed during packet reception; and wherein $P_N$ is the receiver power consumption when the receiver is searching for packets but no packet is being received. Thus, the receiver algorithm can be designed to choose $\gamma$ and $\alpha$ to minimize the overall power consumption given the constraint above.

For at least some embodiments, determining whether the signal quality of the received multi-carrier signal is better than the predetermined signal quality comprises measuring an SNR of the received signal during a preamble of the received signal, and comparing the measured SNR with an approximate required SNR.

At least some embodiments further include determine whether the received signal was received through a LOS channel or a NLOS channel, and selecting the approximate required SNR based on whether a LOS channel or NLOS channel.

At least some embodiments further include determining a noise profile of a channel of the received signal, and selecting the subcarriers of the multi-carrier signal to perform receiver signal processing and which subcarriers of the multi-carrier signal not to perform receiver signal processing based on the noise profile.

Another embodiment includes selecting the subcarriers of the multi-carrier signal to process or not to process in the presence of tonal interference which could affect several sub-carriers around the interfering tone. In such a scenario, selection of sub-carriers for receive processing involves knowledge of the affected sub-carriers which is further dependent on the strength of the interference. In many cases, the interference profile due to the tone is either estimated or known via prior measurements. In such a case, for an embodiment, the sub-carriers that are affected by the interference are given a higher priority in the "not to process" list when compared to the ones based on the lowest SNR. However, if the number of sub-carriers affected by interference is small and there is more room for other sub-carriers not to be processed, then the low SNR sub-carriers are added to the "not to process list". An added advantage of knowing the interference profile is that SNR does not have to be explicitly estimated on the affected sub-carriers, thereby reducing processing complexity. It is to be understood that for at least some embodiments the terms interference profile and noise profile may be used interchangeably.

Figure 10:
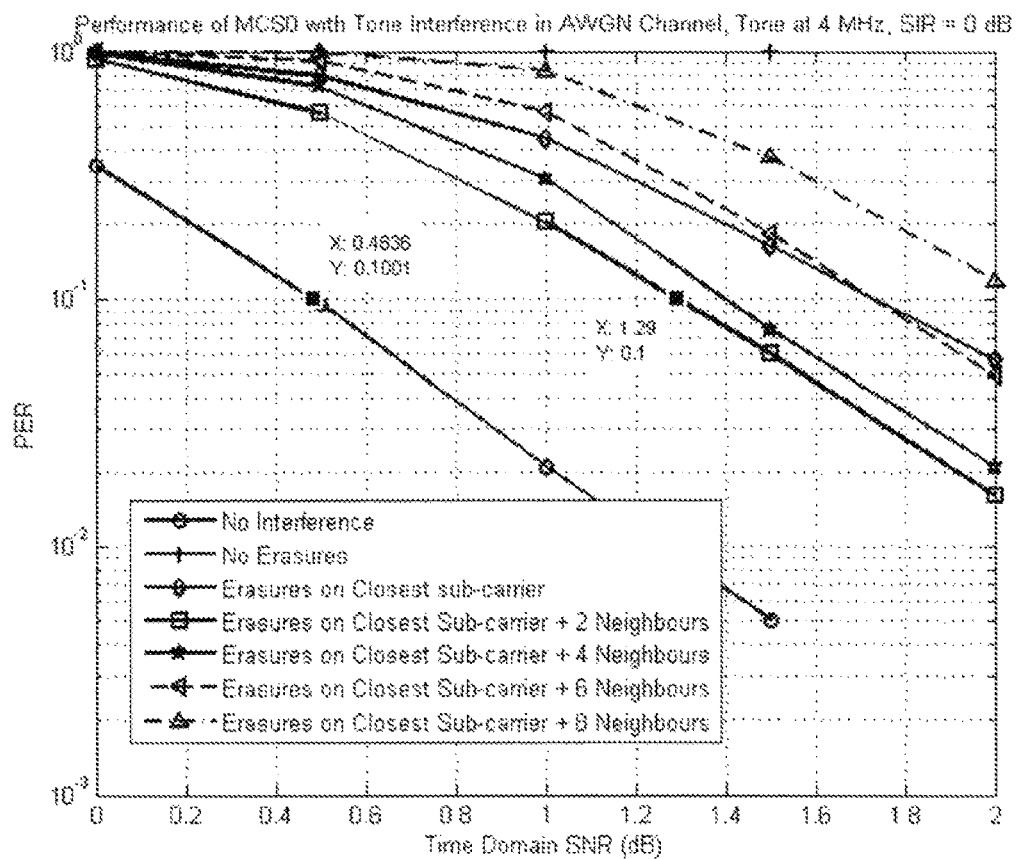
FIG. 10 is a plot of results of a simulation that shows the improvement in performance by using erasures in a neighborhood of the detected or known a priori interference for an SIR (Signal-to-Interference Ratio) of 0 dB, according to an embodiment.
Figure 11:
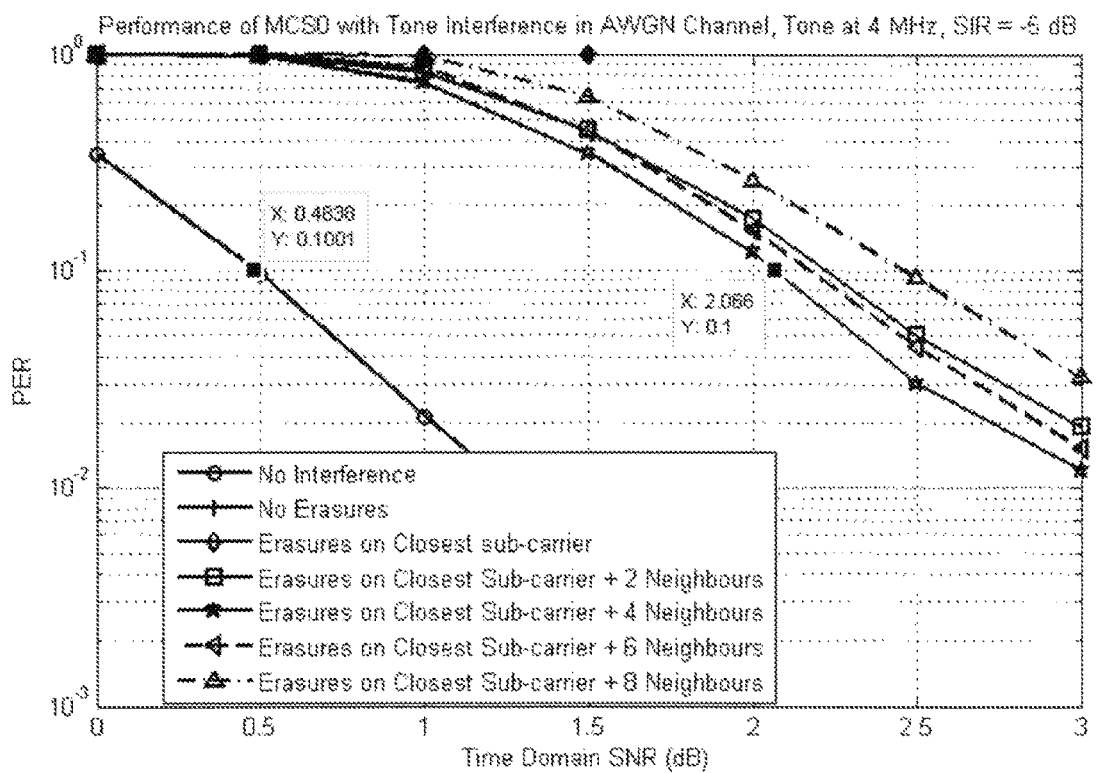
FIG. 11 is a plot of results of a simulation that shows the improvement in performance by using erasures in a neighborhood of the detected or known a priori interference for an SIR (Signal-to-Interference Ratio) of −5 dB, according to an embodiment.

FIG. 10 shows a plot of the performance of MCS0 with an interfering tone at 4 MHz as a function of how many neighboring tones are erased, according to an embodiment. The Signal to Interference (SIR) power ratio is 0 dB. Note that declaring erasures on some sub-carriers turns out to be useful when compared to processing all the sub-carriers. It can be observed that the performance is improved by erasing out the closest sub-carrier and two of its adjacent neighbors (one on each side). In a case where the interfering tone is at higher power level compared to the signal, performance can be improved by erasing out more sub-carriers as shown in FIG. 11. FIG. 11 is a plot of results of a simulation that shows the improvement in performance by using erasures in a neighborhood of the detected or known a priori interference for an SIR (Signal-to-Interference Ratio) of −5 dB, according to an embodiment.

FIG. 9B shows flow charts that include steps of methods for selective processing of subcarriers of a received multi-carrier signal, according to another embodiment. A first step 911 includes determining whether a signal quality of a received multi-carrier signal is better than a predetermined signal quality, wherein the predetermined signal quality is selected to ensure that a probability of error free decoding of the received signal is greater than a predetermined threshold. A second step 921 includes after determining that the signal quality of the received multi-carrier signal is better than the predetermined signal quality, determining which subcarriers of the multi-carrier signal not to perform receive signal processing based on a relative signal quality of each of the subcarriers.

FIG. 12A shows flow charts that include steps of methods for selective processing of subcarriers of a received multi-carrier signal, according to another embodiment. A first step 1210 includes determining whether a signal quality of a received multi-carrier signal is better than a predetermined signal quality, wherein the predetermined signal quality is selected to ensure that a probability of error free decoding of the received signal is greater than a predetermined threshold. A second step 1220 includes after determining that the signal quality of the received multi-carrier signal is better than the predetermined signal quality, determining which of subcarriers of the multi-carrier signal to perform receive signal processing based on a function of a selected coding rate.

FIG. 12B shows flow charts that include steps of methods for selective processing of subcarriers of a received multi-carrier signal, according to another embodiment. A first step 1211 includes determining whether a signal quality of a received multi-carrier signal is better than a predetermined signal quality, wherein the predetermined signal quality is selected to ensure that a probability of error free decoding of the received signal is greater than a predetermined threshold. A second step 1221 includes after determining that the signal quality of the received multi-carrier signal is better than the predetermined signal quality, determining which subcarriers of the multi-carrier signal not to perform receive signal processing based on a function of a selected coding rate.

For at least some embodiments, the MAC layer of the receiver keeps track of packet error rate statistics over time and tracks whether there is a strong correlation (greater than a correlation threshold) between the predicted signal quality for a given packet (by the PHY layer) and whether the packet was decoded successfully or not. Additionally, for at least some embodiments, the MAC layer also determines whether the noise and interference statistics reported by the PHY are varying rapidly from packet to packet or have coherence times (coherence time can be based on duration over which statistics are correlated above a correlation threshold) on the order of tens of packets or longer. If the wireless environment is reasonably predictable based on the above observations (that is, correlation of statistics over time is above a correlation threshold), then the MAC can enable the PHY to use selective subcarrier processing. On the other hand, if the wireless environment is rapidly changing (that is, correlation of statistics of over short duration like a few packets is less than a threshold), then the power consumption benefits may not be sufficient to warrant enabling of the selective sub-carrier processing. For at least some embodiments, the MAC statistics are also used to fine tune the thresholds used in selective subcarrier processing. In a highly volatile wireless environment (low correlation over short duration such as a few packets), more conservative signal quality thresholds may be require which effectively reduce the number of subcarriers that are not processed. Conversely, in more stable and predictable environments (high correlation above a correlation threshold over many packets), signal quality thresholds can be adjusted so that percentage of subcarriers processed can approach the theoretical limits discussed previously based on SNR, type of code, and coding rate. For at least some embodiments, the MAC estimates the channel type based on statistics over time and set thresholds for selective sub-carrier processing.

For at least some embodiments, determining which of subcarriers of the multi-carrier signal not to perform receive signal processing is further based on MAC layer information obtained over previously received packets. For at least some embodiments, the predetermined signal quality is based on MAC layer information obtained over previously received packets. For at least some embodiments, the MAC layer information includes, for example, the previously described channel statistics (such as, packet error rate statistics, noise interference statistics, channel type, coherence times), link quality, data rate, etc, across packets previously received on the current channel.

A semiconductor intellectual property core, such as a microprocessor core, or a portion thereof, fixed function circuitry, or configurable circuitry embodying the disclosure can be described in data stored on a machine readable medium. Such data can be in accordance with a Hardware Description Language (HDL), and may include Register Transfer Language (RTL) description data, for example. This descriptive data can be used to simulate, verify, and/or produce a specific implementation of the disclosure (for example, an integrated circuit, or a combination of integrated circuit(s) and discrete components).

The disclosure explained example embodiments using block diagrams (such as, the block diagrams of FIGS. 1, 4, 6, 8) that, for example, show a flow of data through different functional blocks. To a person of ordinary skill in the relevant arts, the names given to these functional blocks also describe example structure for implementing those functions, without including unnecessary detail. These functional blocks can have varied implementations, including using fixed-function circuitry, partially configurable circuitry, special-purpose processors, such as digital signal processors, generally programmable processor cores, and combinations thereof. For example, some implementations may implement some of the depicted functional blocks using software configuring a processor, while others may use fixed-function circuitry. Since different implementations may use different physical hardware elements, the depiction of particular arrangements of functional blocks does not imply that implementations need to have separate structures implementing those functions. For example, a signal quality determination processing block, and subcarrier selection processing can be implemented as separate processing (such as, signal quality determination processing block 130 or subcarrier selection processing block 170) from a processor, but such processing also could be implemented as a resource shared with other functional blocks, or a multiplier driven by decoded instructions from the processor.

This disclosure explains that a processor can perform certain aspects of methods according to the disclosure. Such processor can be a generally programmable processor, which can execute machine readable code according to an instruction set architecture. Such processor also can have more limited configurability, such as allowing configurability using supplied sets of parameters that modify execution of a set of sub-routines available from a non-volatile memory, for example. The processor also can include fixed-function circuitry, which can interoperate with programmable or configurable elements of the processor. When such a processor is configured to perform a function or action described in the disclosure, the processor effectively becomes circuitry for performing that function or action, even while the processor also can be circuitry for performing other functions or actions. As such, the term "circuitry" does not imply a single electrically connected set of circuits, and circuitry may be fixed-function, configurable, or programmable.

Although specific embodiments have been described and illustrated, the embodiments are not to be limited to the specific forms or arrangements of parts so described and illustrated. The described embodiments are to only be limited by the claims.

What is claimed:

1. A receiver, comprising:
a receive chain operative to receive a multi-carrier signal;
a controller, the controller operative to:
determine whether a signal quality of the received multi-carrier signal is better than a predetermined signal quality, wherein the predetermined signal quality is selected to ensure that a probability of error free decoding of the received signal is greater than a predetermined threshold;
determine which of subcarriers of the multi-carrier signal not to perform receive signal processing based on a relative signal quality of each of the subcarriers after determining that the signal quality of the received multi-carrier signal is better than the predetermined signal quality.

2. The receiver of claim 1, wherein the relative signal quality of each of the subcarriers is determined based on a comparison between a signal quality of each of the subcarriers relative to the predetermined signal quality.

3. The receiver of claim 1, wherein the controller is further operative to determine a percentage of the subcarriers of the multi-carrier signal to perform receiver signal processing or not to determine the receiver signal processing based on a function of a selected coding rate.

4. The receiver of claim 1, wherein the controller is further operative to:
predict a plurality of LLRs (log likelihood ratios) comprising predicting an LLR for each bit of a received symbol of each subcarrier based on the SNR of the subcarrier, wherein the LLR reflects a confidence level of the bit;
generate a de-interleaved sequence comprising de-interleaving the plurality of LLRs; and
select subcarriers of the multi-carrier signal to not to perform receiver signal processing based on avoiding a number of confidence levels in contiguous sequences of the de-interleaved sequence that are below a confidence threshold, that is above a run-length threshold.

5. The receiver of claim 1, wherein the received signal comprises a transmit signal received though a transmission medium, wherein the transmit signal includes LDPC (low-density parity check) encoding, and wherein the controller is further operative to:
specify a parity check matrix based on the LDPC encoding;
generate a set of parity check bits, comprising multiplying a block of n input bits by the parity check matrix, wherein the input bits and any information associated with the input bits are denoted as a variable nodes, and wherein the parity check bits and any information associated with the parity check bits are denoted as check nodes;
identify a number of check nodes connected to a variable node having a reliability below a reliability threshold; and
select the subcarriers of the multi-carrier signal to perform receiver signal processing based on keeping the number of check nodes connected to a worst variable node having a reliability below a reliability threshold less than a weak node number threshold.

6. The receiver of claim 5, wherein a reliability of a variable node is determined based on a channel estimate and noise estimate for a subcarrier corresponding to the variable node.

7. The receiver of claim 1, wherein the receiver further includes multiple receiver antennas, and wherein a channel between the receiver and a transmitter of the receive signal is characterized by a channel matrix for each subcarrier, and further comprising selecting the subcarriers of the multi-carrier signal to perform receiver signal processing based on orthogonality of the channel matrix of each subcarrier being less than a threshold.

8. The receiver of claim 7, wherein the orthogonality is determined based on channel and noise estimated during a preamble of the received signal.

9. The receiver of claim 1, wherein determining whether the signal quality of the received multi-carrier signal is better than the predetermined signal quality comprises measuring an SNR of the received signal during a preamble of the received signal, and comparing the measured SNR with an approximate required SNR.

10. The receiver of claim 9, further comprising determine whether the received signal was received through a LOS channel or a NLOS channel, and selecting the approximate required SNR based on whether the received signal was received through a LOS channel or a NLOS channel.

11. The receiver of claim 9, wherein the controller is further operative to determine a noise profile of a channel of the received signal, and selecting the subcarriers of the multi-carrier signal to perform receiver signal processing and which subcarriers of the multi-carrier signal not to perform receiver signal processing based on the noise profile.

12. The receiver of claim 1, wherein determining which of subcarriers of the multi-carrier signal not to perform receive signal processing is further based on MAC layer information obtained over previously received packets.

13. The receiver of claim 1, wherein the predetermined signal quality is based on MAC layer information obtained over previously received packets.

14. A method, comprising:
   determining whether a signal quality of a received multi-carrier signal is better than a predetermined signal quality, wherein the predetermined signal quality is selected to ensure that a probability of error free decoding of the received signal is greater than a predetermined threshold;
   after determining that the signal quality of the received multi-carrier signal is better than the predetermined signal quality, determining which of subcarriers of the multi-carrier signal to perform receive signal processing based on a relative signal quality of each of the subcarriers.

15. The method of claim 14, wherein the relative signal quality of each of the subcarriers is determined based on a comparison between a signal quality of each of the subcarriers relative to the predetermined signal quality.

16. The method of claim 14, comprising additionally determining a percentage of the subcarriers of the multi-carrier signal to perform receiver signal processing based on a function of a selected coding rate.

17. The method of claim 14, further comprising:
   predicting a plurality of LLRs (log likelihood ratios) comprising predicting an LLR for each bit of a received symbol of each subcarrier based on the SNR of the subcarrier, wherein the LLR reflects a confidence level of the bit;
   generating a de-interleaved sequence comprising de-interleaving the plurality of LLRs; and
   selecting subcarriers of the multi-carrier signal to perform receiver signal processing based on avoiding a number of confidence levels in contiguous sequences of the de-interleaved sequence that are below a confidence threshold, that is above a run-length threshold.

18. The method of claim 14, wherein the received signal comprises a transmit signal received though a transmission medium, wherein the transmit signal includes LDPC (low-density parity check) encoding, and further comprising
   specifying a parity check matrix based on the LDPC encoding;
   generating a set of parity check bits, comprising multiplying a block of n input bits by the parity check matrix;
   wherein the input bits and any information associated with the input bits are denoted as a variable nodes; and
   wherein the parity check bits and any information associated with the parity check bits are denoted as check nodes;
   identifying number of check nodes connected to a variable node having a reliability below a reliability threshold; and
   selecting the subcarriers of the multi-carrier signal to perform receiver signal processing based on keeping the number of check nodes connected to a worst variable node having a reliability below a reliability threshold less than a weak node number threshold.

19. The method of claim 18, wherein a reliability of a variable node is determined based on a channel estimate and noise estimate for a subcarrier corresponding to the variable node.

20. The method of claim 14, wherein a receiver that receives the receive signal includes multiple receiver antennas, and wherein a channel between the receiver and a transmitter of the receive signal is characterized by a channel matrix for each subcarrier, and further comprising selecting the subcarriers of the multi-carrier signal to perform receiver signal processing based on orthogonality of the channel matrix of each subcarrier being less than a threshold.

21. The method of claim 20, wherein the orthogonality is determined based on channel and noise estimated during a preamble of the received signal.

22. The method of claim 14, further comprising selecting the subcarriers of the multi-carrier signal to perform receiver signal processing and which subcarriers of the multi-carrier signal not to perform receiver signal processing based on a function of power consumed per processed subcarrier, and a probability of decoding error.

23. The method of claim 14, wherein determining whether the signal quality of the received multi-carrier signal is better than the predetermined signal quality comprises measuring an SNR of the received signal during a preamble of the received signal, and comparing the measured SNR with an approximate required SNR.

24. The method of claim 23, further comprising determining whether the received signal was received through a LOS channel or a NLOS channel, and selecting the approximate required SNR based on whether the received signal was received through a LOS channel or a NLOS channel.

25. The method of claim 23, further comprising determining a noise profile of a channel of the received signal, and selecting the subcarriers of the multi-carrier signal to perform receiver signal processing and which subcarriers of the multi-carrier signal not to perform receiver signal processing based on the noise profile.

26. A method, comprising:
   determining whether a signal quality of a received multi-carrier signal is better than a predetermined signal quality, wherein the predetermined signal quality is selected to ensure that a probability of error free decoding of the received signal is greater than a predetermined threshold; and
   after determining that the signal quality of the received multi-carrier signal is better than the predetermined signal quality, determining which subcarriers of the multi-carrier signal not to perform receive signal processing based on a relative signal quality of each of the subcarriers.

27. A method, comprising:
   determining whether a signal quality of a received multi-carrier signal is better than a predetermined signal quality, wherein the predetermined signal quality is selected to ensure that a probability of error free decoding of the received signal is greater than a predetermined threshold;
   after determining that the signal quality of the received multi-carrier signal is better than the predetermined signal quality, determining which of subcarriers of the multi-carrier signal to perform receive signal processing based on a function of a selected coding rate.

28. A method, comprising:
   determining whether a signal quality of a received multi-carrier signal is better than a predetermined signal quality, wherein the predetermined signal quality is selected to ensure that a probability of error free decoding of the received signal is greater than a predetermined threshold; and
   after determining that the signal quality of the received multi-carrier signal is better than the predetermined signal quality, determining which subcarriers of the multi-carrier signal not to perform receive signal processing based on a function of a selected coding rate.

29. A receiver, comprising:

a receive chain operative to receive a multi-carrier signal;

a controller, the controller operative to:

determine whether a signal quality of the received multi-carrier signal is better than a predetermined signal quality, wherein the predetermined signal quality is selected to ensure that a probability of error free decoding of the received signal is greater than a predetermined threshold;

determine which of subcarriers of the multi-carrier signal to perform receive signal processing and which subcarriers not to perform receive signal processing based on a relative signal quality of each of the subcarriers after determining that the signal quality of the received multi-carrier signal is better than the predetermined signal quality.

* * * * *